Jan. 5, 1937.  F. C. WAPPLER  2,067,031
INSTRUMENT FOR INSERTION INTO CONSTRICTED BODY CAVITIES
Filed March 23, 1934  2 Sheets-Sheet 1
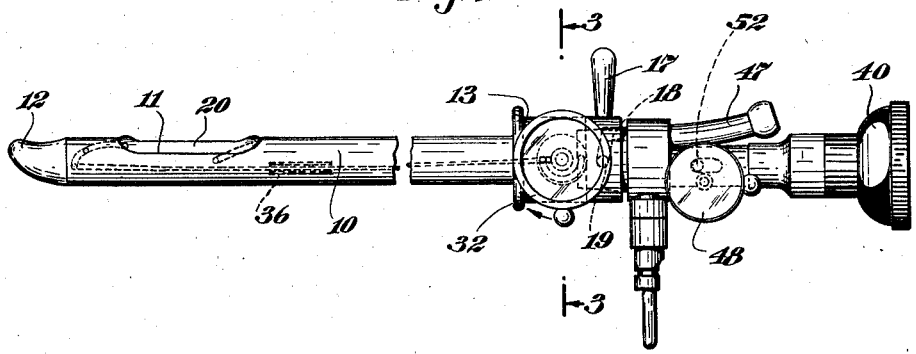
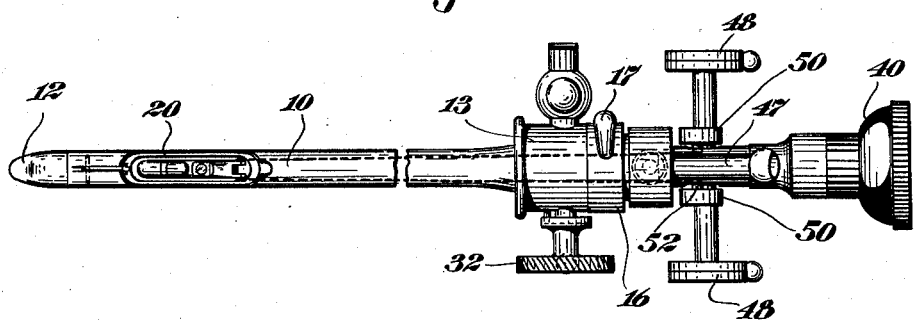
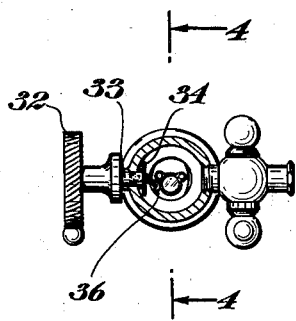
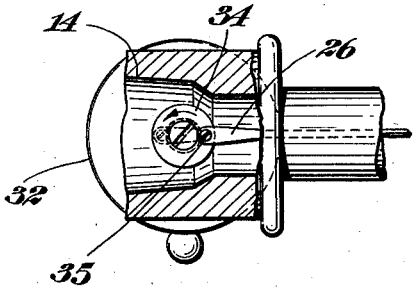
INVENTOR
Frederick Charles Wappler,
BY
Frederick Breitenfeld
ATTORNEY

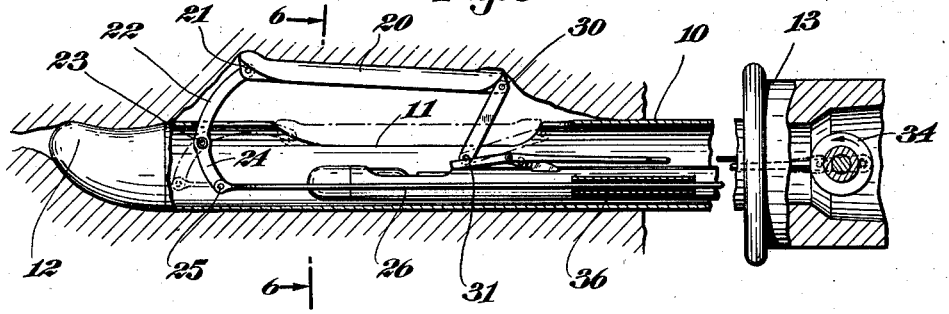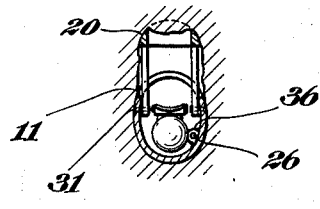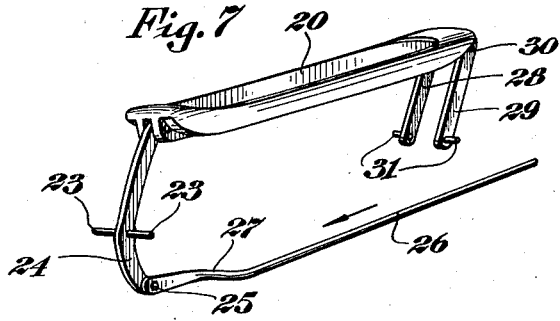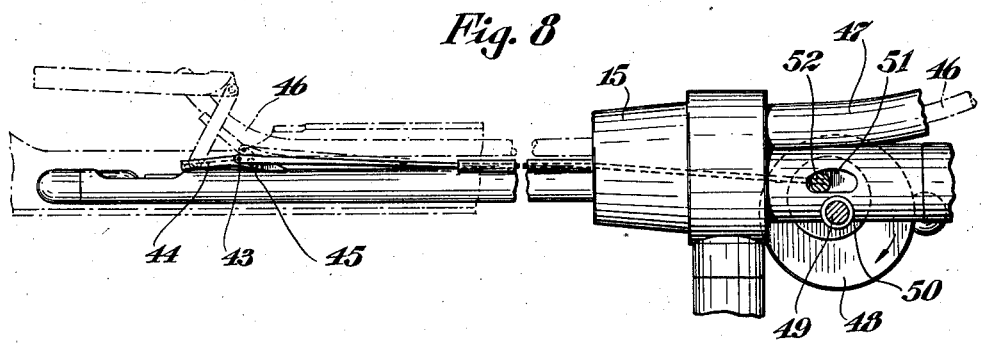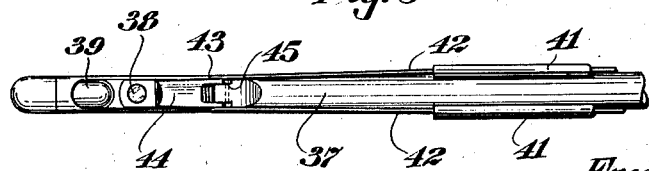

Patented Jan. 5, 1937

2,067,031

UNITED STATES PATENT OFFICE 2,067,031

INSTRUMENT FOR INSERTION INTO CONSTRICTED BODY CAVITIES

Frederick Charles Wappler, New York, N. Y.

Application March 23, 1934, Serial No. 716,952

11 Claims. (Cl. 128—7)

My present invention relates generally to surgical instruments, and has particular reference to an improved instrument provided with means for dilating a constricted body cavity into which the instrument is inserted.

In the examination of certain body cavities, and/or in the performance of operations therein, it is not always possible to effect dilation of the cavity by means of a fluid. This is particularly so in the case of short constricted channels such as the cervix uteri or the like. It is a general object of my present invention to provide an instrument which is furnished with improved mechanical dilating means to permit examination of, and operations in, a cavity or channel of this sort.

A more specific object of my invention is to provide a dilating device which functions in a simple and efficient manner, and with a maximum degree of safety to the patient. It is a feature of my invention to provide a construction which effects a desired dilation of a cavity with a minimum likelihood of injury to the delicate, usually convoluted, membrane or tissue which lines the cavity.

Another object of the invention is to provide an instrument whereby the desired dilation may be effected under maintained illuminated vision; and whereby the dilation may be accompanied or followed by an operative procedure, also under illuminated vision.

While my invention is not restricted in its applicability to any specific ailment, cavity, channel, or mode of treatment, I aim generally to provide an instrument whereby an efficient dilation is accomplished without in any way impeding the simultaneous or subsequent application, to the tissue, of an operating tool, applicator, electrode, or the like.

One of the characterizing features of the present invention lies in providing a dilator frame in association with the fenestra of an endoscopic sheath, and in combination with a mechanism for protruding the frame bodily in a lateral direction so as to urge it flatwise against the cavity wall which is encountered thereby. This flatwise encounter of the frame against the cavity wall permits me to construct the frame with a central aperture therein, through which an operating tool or the like may find passage, such aperture furnishing also a means for obtaining an unimpeded field of illuminated vision.

One of the features of my invention lies in constructing and configuring the dilator frame in a manner whereby the same is normally disposed in the plane of the sheath fenestra and in substantial registry with the rim of the fenestra, whereby there is a complete absence of protruding parts, ridges, or irregularities when the dilator frame is retracted, thus permitting the instrument to be safely inserted and withdrawn into and out of the cavity.

In the preferred construction herein illustrated by way of example, the dilator frame is substantially O-shaped and is articulated to the sheath by means of a parallel-motion mechanism which permits the frame to be moved bodily away from the fenestra when the instrument has been inserted to the desired or proper extent. The preferred form of instrument also contemplates the use of an operating tool in conjunction with a mechanical deflector, and the parts are so arranged and constructed that the deflector may be caused to operate, unimpeded, at all times.

I achieve the foregoing objects, and such other objects as may hereinafter appear or be pointed out, in the manner illustratively exemplified in the accompanying drawings, wherein—

Figure 1 is a longitudinal side view of an instrument embodying the features of the present invention;

Figure 2 is a top view of Figure 1;

Figure 3 is a cross-sectional view taken substantially along the line 3—3 of Figure 1;

Figure 4 is an enlarged cross-sectional view taken substantially along the line 4—4 of Figure 3;

Figure 5 is an enlarged cross-sectional view taken in the same direction as Figure 1, showing the mode of functioning of the instrument, with parts broken away for the sake of clearness;

Figure 6 is a cross-sectional view taken substantially along the line 6—6 of Figure 5;

Figure 7 is a perspective view of the dilator frame and parallel-motion mechanism shown by itself;

Figure 8 is a longitudinal view taken in the same direction as Figures 1 and 5, showing the construction and mode of operation of the tool deflector; and Figure 9 is a plan view of the forward portion of Figure 8.

The sheath 10 is provided near its forward end with the lateral fenestra 11, and with the usual forward nose piece or beak 12. At its rear end the sheath carries the skirt 13 having the rearwardly tapered bore 14. The latter is adapted to receive the plug 15 of an assembly illustrated most clearly in Figure 8 and including various mechanical parts that are adapted to be inserted into the sheath 10. A locking sleeve or mechanism 16, controllable by means of the handle 17, is preferably associated with the sleeve 13 to facilitate the engagement of the plug 15 within the bore 14, and to lock the several parts together. The locking mechanism 16—17 forms no essential part of the present invention, and may be of any suitable or desired character. Bayonet slots 18 may, for example, be adapted to engage and advance a pin or pins 19 provided for this purpose on the plug 15.

Mounted along the rim of the fenestra 11 is a dilator frame 20 which is substantially O-shaped and which is illustrated most clearly in Figure 7. This frame is so shaped and configured that its outer surface is rounded and devoid of sharp edges and projections; and the frame is adapted to fit snugly against the rim of the fenestra 11 when it is in the retracted position shown in Figures 1 and 2 and illustrated in dot-and-dash lines in Figure 5. When in this retracted position, the exposed surfaces of the frame 20 form smooth continuations of the adjacent exterior surfaces of the sheath 10, whereby the entire instrument may be inserted into and withdrawn from even the most constricted cavity with a maximum of facility and safety.

The frame 20 is articulated to the sheath by means of a parallel-motion mechanism that is illustrated most clearly in Figures 5, 6, and 7. At the forward end of the frame 20 there is articulated, as at 21, the outer end of a link 22 which is pivoted at its midportion 23 to the walls of the sheath 10. The link continues inwardly to provide the inner arm 24, whose free end is articulated, as at 25, to the end of a rearwardly extending control rod 26. The latter is bent, as at 27, so that the head of the rod 26 is laterally disposed and lies closely adjacent to one of the side walls of the sheath 10.

A second and similar link connection is made between the rear end of the frame 20 and the sheath 10, but the rear link, in accordance with the present invention, consists of the two parts 28 and 29. The outer ends of these parts are articulated, as at 30, to the rear of the frame 20; and the inner ends are pivoted, as at 31, to the opposite side walls of the sheath 10.

The pivot points 23 and 31 are so positioned that the frame 20 will swing between the dot-and-dash and the full-line dispositions illustratively shown in Figure 5. This movement is effective by reciprocation of the control rod 26, whereby the frame is moved bodily in a substantially lateral direction, causing it to encounter the cavity wall in a flatwise manner, thereby effecting a safe yet efficient dilation of this wall, as indicated most clearly in Figure 5 and 6.

The movements of the control rod 26 are controlled, from the rear of the sheath 10, by means of the handwheel 32 carried on the outer end of a spindle 33, the latter carrying a disc 34 on its inner end, and the disc 34 being articulated, as at 35, to the rear end of the rod 26. By rotating the knob or wheel 32 in the direction of the arrows of Figures 1 and 4, the rod 26 is caused to be retracted by an amount which moves the frame 20 from the dot-and-dash position of Figure 5 into the full-line position thereof.

Preferably, the rod 26 is caused to pass through a guide tube 36 secured to the sheath near the fenestra to assure a maintained lateral disposition of the rod 26 at all times.

The mechanism that is adapted to be inserted into the sheath consists of a telescopic tube 37 having at its forward end an objective lens 38 and an electric lamp 39. The electrical connections for the lamp 39 have not been illustrated since they are known in the art per se, nor has the interior mechanism of the telescope been shown. Suffice it to say that the objective 38 commands a substantially lateral field of vision, and that the telescope is provided with the usual rear eyepiece 40 through which the desired illuminated view may be obtained. The telescope 10 is mounted, preferably in removable manner, in association with the plug 15; and the objective 38 is so positioned that when the plug 15 is properly inserted into the skirt 13, the dilated cavity wall will be illuminated and rendered visible through the fenestra of the sheath.

Carried by the telescopic tube 37 are the two lateral guide tubes 41 which accommodate the rearwardly extending control rods 42, the latter being articulated at their forward ends, as at 43, to a tool deflector 44. The latter is pivoted to the telescopic tube, as at 45, whereby a retraction of the control rods 42 will swing the deflector 44 from the full-line position of Figure 8 into the dot-and-dash position thereof. This serves, in well known manner, to deflect the forward end of a suitable tool 46, the latter having been illustrated only in dot-and-dash lines, since it forms no material part of the present invention. This tool is applicable through the instrument by insertion into the guide tube 47 which projects rearwardly from the plug 15, it being understood that the plug 15 is provided with a bore in registry with the tube 47 to permit insertion and removal of the tool 46.

The deflector 44 is positioned between the opposite sides of the frame 20, and between the spaced parts 28 and 29 of the rear link of the parallel-motion mechanism. The deflector is thus operable at all times in its contemplated manner, without being in any way impeded by the dilator frame or the mechanism controlling the movements of the latter.

Any suitable means may be provided for effecting the reciprocation of the control rods 42, and I have illustratively shown a handwheel 48 mounted upon a spindle 49, the latter carrying the crankwheel or disc 50. The wheel 50 may be provided with the slot or opening 51 slidably engaging a pin 52 with which the rear ends of the control rods 42 are associated.

The utility and mode of operation of the instrument will be clear from the description given. After insertion of the instrument into the desired cavity, manipulation of the wheel 32 serves to advance the dilator frame bodily in a lateral direction, whereby the encountered cavity wall is distended and pushed away from the fenestra of the sheath. This encounter is perfectly safe by virtue of the flatwise engagement of the rounded exterior surfaces of the dilator frame with the membrane or tissue lining the cavity. The dilation which is effected is of an efficient character, serving to spread into the illuminated field of vision a considerable expanse of the engaged cavity wall. By then inserting the desired tool, of whatever character it may be, and guiding its forward end by means of the deflector 44, any desired operation upon the distended cavity wall may be carried out.

It will be observed that the distention of the cavity, and the subsequent or simultaneous manipulation of the operating tool, may be carried out under a maintained illuminated vision; and that the manipulation of the deflector mechanism and of the operating tool are entirely independent of and unimpeded by the dilator frame itself or the mechanism which controls its movements.

When the desired operation has been completed, the operating tool is withdrawn; the deflector 44 is adjusted into its retracted disposition; the dilator frame 20 is retracted into registry with the rim of the fenestra 11; and the instrument is then withdrawn from the cavity.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In an instrument for insertion into a constricted body cavity, a sheath having a lateral fenestra, a rigid dilator frame arranged in the plane of the fenestra, and means for protruding the frame bodily in a lateral direction so as to urge the same flatwise against the cavity wall encountered thereby.

2. In an instrument for insertion into a constricted body cavity, a sheath having a lateral fenestra, a dilator frame arranged in the plane of the fenestra, and a parallel-motion mechanism for protruding the frame bodily in a lateral direction.

3. In an instrument for insertion into a constricted body cavity, a sheath having a lateral fenestra, a dilator frame arranged in the plane of the fenestra and provided with a central aperture through which an operating tool may function, and means for protruding the frame bodily in a lateral direction so as to urge the same flatwise against the cavity wall encountered thereby.

4. In an instrument for insertion into a constricted body cavity, a sheath having a lateral fenestra, a dilator frame arranged in the plane of the fenestra, and means for protruding the frame bodily in a lateral direction so as to urge the same flatwise against the cavity wall encountered thereby, said frame having a contour forming a smooth continuation of the sheath contour when the dilator is retracted.

5. In an instrument for insertion into a constricted body cavity, a sheath having a lateral fenestra, an O-shaped dilator frame normally in registry with the rim of said fenestra, and means for protruding the frame bodily in a lateral direction so as to urge it flatwise against the cavity wall encountered thereby.

6. In an instrument for insertion into a constricted body cavity, a sheath having a lateral fenestra, a dilator frame, and a parallel-motion mechanism for protruding the frame bodily in a lateral direction, said mechanism comprising a pair of links whose outer ends are pivoted to the frame at the front and rear thereof, the inner ends of the links being pivoted to the sheath.

7. In an instrument for insertion into a constricted body cavity, a sheath having a lateral fenestra, a dilator frame, and a parallel-motion mechanism for protruding the frame bodily in a lateral direction, said mechanism comprising a pair of links pivoted to the frame at the front and rear thereof, the rear link consisting of two parallel spaced parts affording passage between them for an operating tool.

8. In an instrument for insertion into a constricted body cavity, a sheath having a lateral fenestra, a dilator frame, a pair of links pivoted at their outer ends to the front and rear of said frame, respectively, the inner ends of the links being pivoted to the sheath, and a control rod pivoted to one of said links and extending rearwardly through the sheath.

9. In an instrument for insertion into a constricted body cavity, a sheath having a lateral fenestra, a dilator frame, a pair of links pivoted at their outer ends to the front and rear of said frame, respectively, the inner ends of the links being pivoted to the sheath, the rear link consisting of two parallel spaced parts affording passage between them for an operating tool, and a control rod pivoted to one of said links and extending rearwardly through the sheath along one lateral wall thereof.

10. In an instrument for insertion into a constricted body cavity, a sheath having a lateral fenestra, a telescope in the sheath and commanding a view out of said fenestra, a tool deflector, a dilator frame, means for protruding the frame bodily out of the fenestra and flatwise against the cavity wall encountered thereby, and means controllable from the rear of the sheath for operating the deflector.

11. In an instrument for insertion into a constricted body cavity, a sheath having a lateral fenestra, a telescope in the sheath and commanding a view out of said fenestra, a tool deflector, a dilator frame, means for protruding the frame bodily out of the fenestra and flatwise against the cavity wall encountered thereby, said means including spaced parallel links pivoted at their outer ends to the rear of the dilator frame and at their inner ends to the sheath, and means for operating the deflector in the space between said links.

FREDERICK CHARLES WAPPLER.